(12) United States Patent
Lemay et al.

(10) Patent No.: US 9,189,292 B2
(45) Date of Patent: *Nov. 17, 2015

(54) RESOURCE ALLOCATION DURING WORKLOAD PARTITION RELOCATION

(75) Inventors: Monica J. Lemay, Austin, TX (US); Purushotama Padmanabha, Bangalore (IN); Yogesh G. Patgar, Bangalore (IN); Shashidhar Soppin, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 593 days.

This patent is subject to a terminal disclaimer.

(21) Appl. No.: 13/423,183

(22) Filed: Mar. 17, 2012

(65) Prior Publication Data

US 2012/0192199 A1   Jul. 26, 2012

Related U.S. Application Data

(63) Continuation of application No. 12/787,077, filed on May 25, 2010, now Pat. No. 8,341,644.

(51) Int. Cl.
*G06F 3/00* (2006.01)
*G06F 9/52* (2006.01)
*G06F 9/50* (2006.01)
*G06F 9/54* (2006.01)

(52) U.S. Cl.
CPC .............. *G06F 9/5077* (2013.01); *G06F 9/50* (2013.01); *G06F 9/54* (2013.01)

(58) Field of Classification Search
CPC ..................................... G06F 9/50; G06F 9/54
USPC .................................. 719/328, 310; 718/104
See application file for complete search history.

(56) References Cited

U.S. PATENT DOCUMENTS

| | | | |
|---|---|---|---|
| 2008/0235378 A1 | 9/2008 | Fried et al. | |
| 2008/0235388 A1 | 9/2008 | Fried et al. | |
| 2008/0270829 A1* | 10/2008 | Craft et al. | 714/15 |
| 2008/0320269 A1 | 12/2008 | Houlihan et al. | |
| 2009/0063684 A1 | 3/2009 | Ingram et al. | |
| 2009/0112969 A1 | 4/2009 | Ganesh et al. | |
| 2010/0161559 A1* | 6/2010 | Patil et al. | 707/647 |
| 2010/0205397 A1* | 8/2010 | Chellam | 711/173 |

OTHER PUBLICATIONS

Reinhard Riedl, Dynamic Adaptive Load Balancing Algorithms for High Performance Transaction Processing and their Evaluation, Aug. 20, 1996.*

* cited by examiner

*Primary Examiner* — Lechi Truong
(74) *Attorney, Agent, or Firm* — Yee & Associates, P.C.; Damion Josephs

(57) ABSTRACT

A method of relocating a workload partition (WPAR) from a departure logical partition (LPAR) to an arrival LPAR determines an amount of a resource allocated to the relocating WPAR on the departure LPAR and allocates to the relocating WPAR on the arrival LPAR an amount of the resource substantially equal to the amount of the resource allocated to the relocating WPAR on the departure LPAR.

11 Claims, 5 Drawing Sheets

RESOURCE ALLOCATION DURING WORKLOAD PARTITION RELOCATION

CROSS-REFERENCE TO RELATED APPLICATION

The present application is a Continuation of U.S. application Ser. No. 12/787,077, filed May 25, 2010, titled Resource Allocation During Workload Partition Relocation, now issued as U.S. Pat. No. 8,341,644.

BACKGROUND OF THE INVENTION

1. Technical Field

The present invention relates generally to the field of workload partitions (WPARs) and more particularly to a method of allocating resources to a WPAR that is relocated from a departure logical partition (LPAR) to an arrival LPAR such that the relocated WPAR is allocated substantially the same amount of the resource on the arrival LPAR as it was allocated on the departure LPAR.

2. Description of the Related Art

A logical partition (LPAR) is the division of a computer's processors, memory, storage, and input/output into multiple sets of resources so that each set of resources can be operated independently with its own operating system instance and applications. The number of logical partitions that can be created depends on the system's processor model and resources available. Typically, partitions are used for different purposes such as database operations or client/server operations or to separate test and production environments. Each LPAR can communicate with the other LPARs as if the other LPAR is in a separate machine. Logical partitioning allows the computer's resources to be used more efficiently.

Recently, virtualization technology has been expanded with workload partitions (WPARs). WPAR technology allows administrators to virtualize their operating system, which allows for fewer operating system images on a partitioned server. Prior to WPARs, an administrator would need to create a new LPAR for each new isolated environment. Every LPAR requires its own operating system image and a certain number of physical resources.

WPARs are much simpler to manage than LPARs. The greatest shortcoming of LPARs is the need to maintain multiple operating system images, which may lead to over-committing expensive hardware resources. While partitioning helps to consolidate and virtualize hardware within a physical machine, operating system virtualization through WPAR technology goes further and allows for an even more granular approach of resource management.

One of the advantages of using WPARs is that they may be moved or relocated from one LPAR to another easily and transparently. The relocating WPAR is check-pointed on the departure LPAR and then restarted on the arrival LPAR. Each WPAR running on an LPAR is allocated a set of the LPAR's resources, such as processors and memory. Resources may be allocated in either a share basis or a percentage basis. Currently, when a WPAR is relocated, there is no mechanism for ensuring that it is allocated as much of a particular resource on the arrival LPAR as it was allocated on the departure LPAR.

SUMMARY OF THE INVENTION

Embodiments of the present invention provide methods of relocating a workload partition (WPAR) from a departure logical partition (LPAR) to an arrival LPAR. The method determines an amount of a resource allocated to the relocating WPAR on the departure LPAR. The method allocates to the relocating WPAR on the arrival LPAR an amount of the resource substantially equal to the amount allocated to the relocating WPAR on the departure LPAR.

If there are no WPARs on the arrival LPAR and the WPARs on the departure LPAR are allocated on a percentage basis, the method allocates the resource by giving the relocating WPAR a percentage-based allocation on the arrival LPAR according to a formula $$\% A = \frac{TRDep \times \% B}{TRArr}$$

wherein: %A is the percentage of the resource allocated to the relocating WPAR after relocation; %B is the percentage of the resource allocated to the relocating WPAR before relocation; TRDep is the total amount of the resource on the departure LPAR; and, TRArr is the total amount of the resource on the arrival LPAR.

If there are no WPARs on the arrival LPAR and the WPARs on the departure LPAR are allocated on a share basis the method determines the amount of the resource allocated to the relocating WPAR on the departure LPAR according to a formula $$AR = \frac{SB \times TRDep}{TSDep}$$

wherein: AR is the amount of the resource allocated to the relocating WPAR; SB is the share of the resource allocated to the relocating WPAR before relocation; TRDep is the total amount of the resource on the departure LPAR; and, TSDep is the total shares of the resource on the departure LPAR. The method allocates the resource by giving the relocating WPAR a percentage-based allocation on the arrival LPAR according to the formula $$\% A = \frac{AR \times 100}{TRArr}$$

wherein: %A is the percentage of the resource allocated to the relocating WPAR after relocation; AR is the amount of the resource allocated to the relocating WPAR; and, TRArr is the total amount of the resource on the arrival LPAR.

If there are no WPARs on the arrival LPAR and WPARs on the departure LPAR are allocated on a share basis, the method allocates the resource by giving the relocating WPAR a percentage-based allocation on the arrival LPAR according to the formula $$\% A = \frac{SB \times TRDep \times 100}{TSDep \times TRArr}$$

wherein: %A is percentage of the resource allocated to the resource to the relocating WPAR after relocation; TRDep is the total amount of the resource on the departure LPAR; TRArr is the total amount of the resource on the arrival LPAR; SB is the share of the resource allocated to the resource to the relocating WPAR before relocation; TSDep is total shares of the resource allocated on the departure LPAR; and, TSArr is the total shares allocated on the arrival LPAR prior to relocation.

If there are WPARs on the arrival LPAR that are allocated on a percentage basis and the WPARs on the departure machine are allocated on a percentage basis, the method allocates the resource by giving the relocating WPAR a percentage-based allocation on the arrival LPAR according to the formula $$\% A = \frac{TRDep \times \% B}{TRArr}$$

wherein: %A is the percentage of the resource allocated to the resource to the relocating WPAR after relocation; %B is the percentage of the resource allocated to the resource to the relocating WPAR before relocation; TRDep is the total amount of the resource on the departure LPAR; and, TRArr is the total amount of the resource on the arrival LPAR.

If there are WPARs on the arrival LPAR that are allocated on percentage basis and the WPARs on the departure LPAR are allocated on a share basis, the method allocates the resource by giving the relocating WPAR a percentage-based allocation on the arrival LPAR according to the formula $$\% A = \frac{SB \times TRDep \times 100}{TSDep \times TRArr}$$

wherein: %A is percentage of the resource allocated to the resource to the WPAR after relocation; TRDep is the total amount of the resource on the departure LPAR; TRArr is the total amount of the resource on the arrival LPAR; SB is the shares allocated to the relocating WPAR before relocation; TSDep is the total share of the resource on the departure LPAR; and, TSArr is the total shares of the resource on the arrival LPAR prior to relocation.

If there are WPARs on the arrival LPAR that are allocated on a percentage basis and WPARs on the departure LPAR are allocated on a share basis, the amount of a resource allocated to the relocating WPAR on the departure LPAR is determined according to the formula $$AR = \frac{SB \times TRDep}{TSDep}$$

wherein: AR is the amount of the resource allocated to the relocating WPAR; SB is the share of the resource allocated to the relocating WPAR before relocation; TRDep is the total amount of the resource on the departure LPAR; and, TSDep is the total shares of the resource allocated on departure LPAR prior to relocation. The allocating includes giving the relocating WPAR a percentage-based allocation on the arrival LPAR according to the formula $$\% A = \frac{AR \times 100}{TRArr}$$

wherein: %A is the percentage of the resource allocated to the relocating WPAR after relocation; AR is the amount of the resource allocated to the relocating WPAR; and, TRArr is the total amount of the resource on the arrival LPAR.

If there are WPARs on the arrival LPAR that are allocated on a share basis and WPARs on the departure LPAR are allocated on a share basis the amount of a resource allocated to the relocating WPAR on the departure LPAR is determined according to the formula $$AR = \frac{SB \times TRDep}{TSDep}$$

wherein: AR is the amount of the resource allocated to the relocating WPAR; SB is the shares of the resource allocated to the relocating WPAR before relocation; TRDep is the total amount of the resource on the departure LPAR; and, TSDep is the total shares of the resource on the departure LPAR. The method gives the relocating WPAR a share-based allocation on the arrival LPAR according to the formula $$SA = \frac{AR \times TSArr}{TRArr - AR}$$

wherein: SA is the share of the resource allocated to the relocating WPAR after relocation; AR is the amount of the resource allocated to the relocating WPAR; TRArr is the amount of the resource on the arrival LPAR; and, TSArr is the total shares of the resource on the arrival LPAR before relocation.

If there are WPARs on the arrival LPAR that are allocated on a share basis and WPARs on the departure LPAR are allocated on a share basis, the method gives the relocating WPAR a share-based allocation on the arrival LPAR according to the formula $$SA = \frac{TSArr \times SB \times TRDep}{TRArr \times TSDep - SB \times TRDep}$$

wherein: SA is the share of the resource allocated to the relocating WPAR after relocation; TRArr is the total amount of the resource of the arrival LPAR; TSArr is the total shares of the resource allocated on the arrival LPAR before relocation; SB is the share of the resource allocated to the relocating WPAR on the departure LPAR before relocation; TSDep is the total shares of the resource allocated on the departure LPAR; and, TSArr is the total shares of the resource allocated on the arrival LPAR prior to the relocation.

If there are WPARs on the arrival LPAR that are allocated on a share basis and the WPARs on the departure LPAR are allocated on a percentage basis the amount of the resource allocated on the departure LPAR to the relocating WPAR is determined according to the formula $$AR = \frac{\% B \times TRDep}{100}$$

wherein: AR is the amount of the resource allocated to the relocating WPAR; %B is the percentage of the resource allocated to the relocating WPAR before relocation; and TRDep is the total amount of the resource on the departure LPAR. The method gives the relocating WPAR a share-based allocation of the resource on the arrival LPAR according to the formula $$SA = \frac{AR \times TSArr}{TRArr - AR}$$

wherein: SA is the share of the resource allocated to the resource to the relocating WPAR after relocation; AR is the amount of the resource allocated to the relocating WPAR; TRArr is the total amount of the resource on the arrival LPAR; and, TSArr is the total shares of the resource allocated on the arrival LPAR before relocation.

If there are WPARs on the arrival LPAR that are allocated on a share basis and the WPARs on the departure LPAR are allocated on a percentage basis, the method gives the relocating WPAR a share-based allocation of the resource on the arrival LPAR according to the formula $$SA = \frac{\frac{\%B}{100} \times TSArr \times TRDep}{TRArr - \frac{\%B}{100} \times TRDep}$$

wherein: SA is the share of the resource allocated to the resource to the relocating WPAR after relocation; %B is the percentage of the resource allocated to the relocating WPAR before relocation; TRDep is the total amount of the resource on the departure LPAR; TRArr is the total amount of the resource on the arrival LPAR; and, TSArr is the total shares of the resource allocated on the arrival LPAR before relocation.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
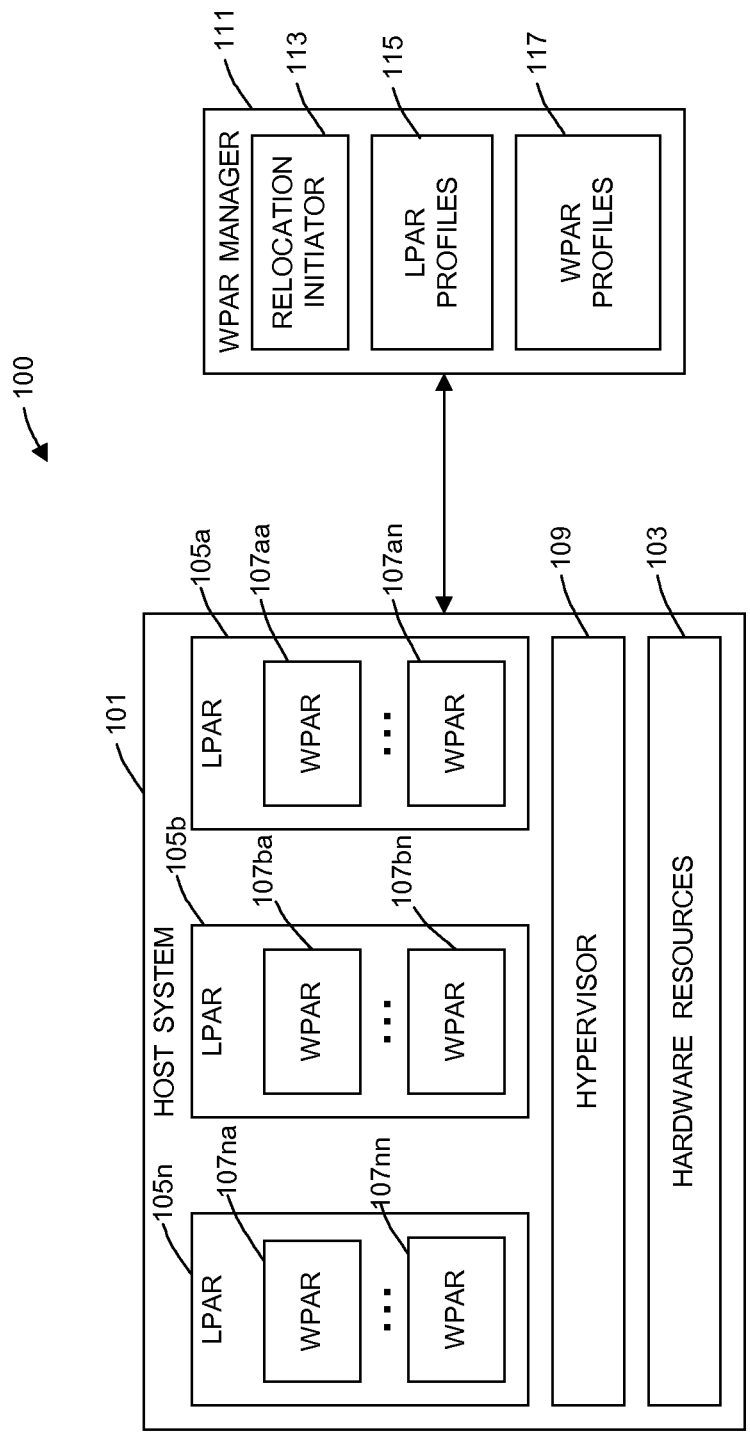
FIG. 1 is a block diagram of an embodiment of a system according to the present invention.

Referring now to drawings, and first to FIG. 1, a system 100 according to the present invention includes a host system 101. As is well known to those skilled in the art, host system 101 includes various hardware resources, indicated generally by the numeral 103. According to the present invention, hardware resources include, among other things, processors and memory (not shown in FIG. 1).

Host system 101 is virtualized system in that it hosts one or more logical partitions (LPARs), including LPAR 105. As is known to those skilled in the art, an LPAR is a division of the resources 103 of host system 101, including its processors and memory, into a set of resources so that each set of resources can be operated independently with its own operating system instance and application or applications.

Each LPAR 105 may include one or more workload partitions (WPARs) 107. A WPAR is a further division of the resources 103 of host system 101 into a set of resources such that each set of resources can be operated independently with its own virtualized operating system image and applications. Inside a WPAR, the application or applications have private execution environments that are isolated from other processes outside the WPAR. As will be explained in detail hereinafter, each WPAR 107 has allocated to it a set of resources 103.

As will be explained in detail hereinafter, WPARs 107 may be dynamically relocated from one LPAR 105 to another. The LPAR to which a WPAR may be relocated may be on the same host system 101 or a different host system. Briefly, in order to relocate a WPAR from a departure LPAR to an arrival LPAR, the relocating WPAR is check-pointed on the departure LPAR. The relocating WPAR is restarted on the arrival LPAR in the same state as it was check-pointed on the departure LPAR. Thus, the relocation of a WPAR is transparent to both the relocated WPAR and to any users of the relocated WPAR.

Host system 101 includes a hypervisor 109. Hypervisor 109 is a software layer that provides the foundation for virtualization of host system 101. Hypervisor 109 enables the hardware of host system 101 to be divided into the multiple LPARS and WPARS, and it ensures strong isolation between them. Hypervisor 109 is responsible for dispatching the LPAR and WPAR workload across the physical processors. Hypervisor 109 also enforces partition security and it can provide inter-partition communication.

System 100 includes a WPAR manager 111. WPAR manager 111 is a software component that manages the WPARs 107 running on host system 101. WPAR manager may be running on host system 101 or on a different physical system in communication with host system 101. WPAR manager provides a user interface (not shown) with which an administrator may control the operation of the WPARs 107 running on host system 101.

WPAR manager 111 includes a relocation initiator 53. Relocation initiator is programmed according to the present invention to manage the relocation of a WPAR from a departure LPAR to an arrival LPAR. Relocation manager 113 has access to a set of LPAR profiles 115 and a set of WPAR profiles 117. LPAR profiles 115 and WPAR profiles 117 contain information on the LPARs and WPARs, respectively, running on host system 101, including the allocations of hardware resources to the respective LPARs and WPARs.

Figure 2A:
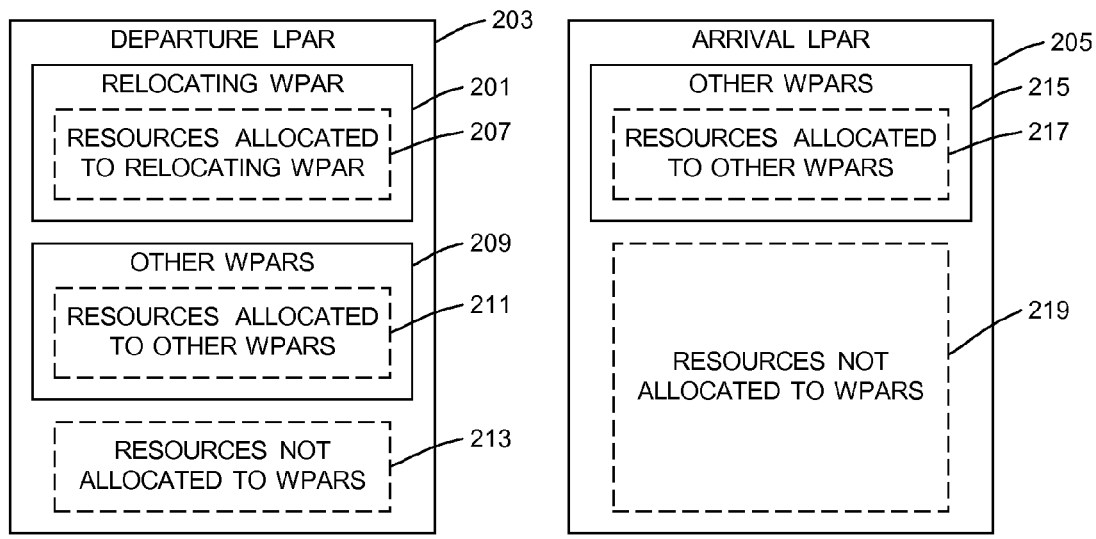
FIG. 2A is a block diagram of a departure LPAR and an arrival LPAR before relocation of a workload partition.
Figure 2B:
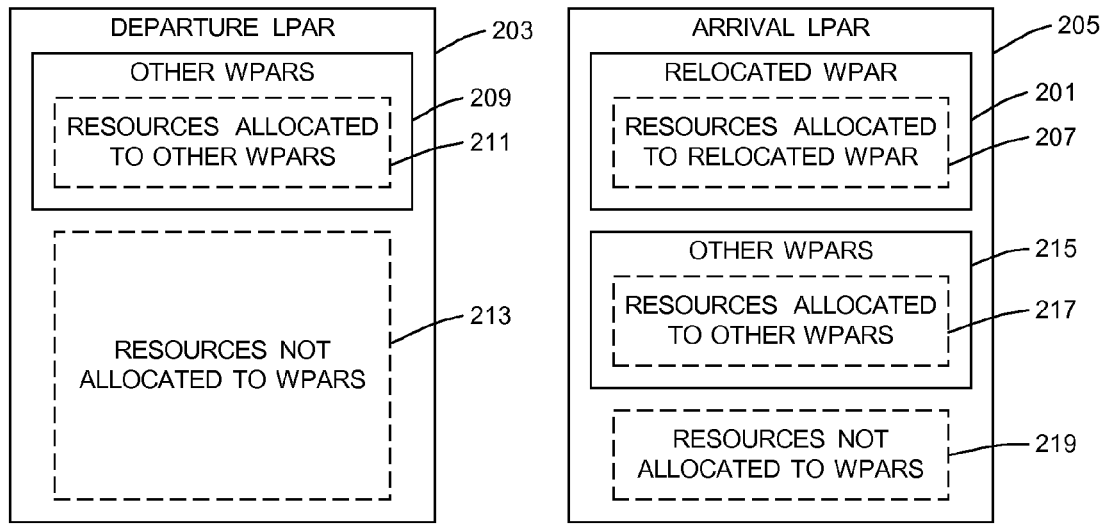
FIG. 2B is a block diagram of the departure LPAR and the arrival LPAR of FIG. 2A after relocation of the workload partition.

FIGS. 2A and 2B comprise block diagrams illustrating the relocation of a relocating WPAR 201 from a departure LPAR 203 to an arrival LPAR 205. As shown in FIG. 2A, relocating WPAR 201 is initially running on departure LPAR 203. Relocating LPAR 201 has allocated to it sets of physical resources, indicated generally at 207. Resources 207 may include processors and memory. According to the present invention, processor resources and memory resources are allocated separately.

Departure LPAR 203 may have running on it other WPARs, indicated generally at 209. Other WPARs 209 have allocated to them resources, indicated generally at 211. Departure LPAR may also have resources not allocated to WPARs, indicated generally at 213. Resources 207, 211, and 213 may be allocated either on a percentage basis or a share basis. On a percentage basis, the allocation of resources 207 to relocating WPAR 201 is expressed as a percentage of the total resources allocated to departure LPAR 203, i.e., resources 207, 211, and 213. Thus, the percentage allocation of resource 207 to relocating WPAR is equal to one hundred times the amount of resource 207 divided by the total of resources 207, 211, and 213. On a share basis, resource allocations are expressed as shares of the allocated resources. Resources 213 not allocated on departure LPAR 203 to WPARs do not count among the shares. In FIG. 2A, relocating WPAR 201 may be allocated X shares of the resource and other WPARs 209 may be allocated Y shares of the resource.

In FIG. 2A, relocating WPAR 201 will be relocated to arrival LPAR 205. Initially, arrival LPAR may have running thereon other WPARs, indicated generally at 215, to which resources indicated generally at 217 may be allocated. Arrival LPAR 205 also has resources 219 that are not allocated to WPARs. The allocations resources 217 that are allocated to other WPARs, if any, are expressed in terms of either percentages or shares. It should be noted that the actual amounts or numbers of resources allocated to departure LPAR and arrival LPAR respectively may not be equal.

FIG. 2B illustrates the configurations of departure LPAR 203 and arrival LPAR 205 after relocation of WPAR 201 to arrival LPAR 205. After relocation, the resources that were allocated on departure LPAR to relocating WPAR 201 may be reallocated to other WPARs 211 or released to resources 213 not allocated to WPARs. On arrival LPAR 205 resources 207 are allocated to relocated WPAR 201. According to the present invention, the actual amount or number of the resource allocated to relocated WPAR 201 on arrival LPAR 205 after relocation is substantially equal to the actual amount or number of the resource allocated to WPAR 201 on departure LPAR 203 before relocation.

The amount of a physical resource allocated to relocating WPAR 201 is AR. The total amount of the physical resource of the departure LPAR 203 is TRDep. The total amount of the physical resource of the arrival LPAR 205 is TRArr. Again, the physical resource may be allocated to a WPAR on either a percentage basis or share basis. Under a percentage-based allocation, the percentage of the resource allocated to relocating WPAR 201 on departure LPAR 203 before relocation is % B. The percentage of the resource allocated to relocating WPAR 201 on the arrival LPAR 205 after relocation is % A. Under a share-based allocation, the shares of the resource allocated to relocating WPAR 201 on departure LPAR 203 before relocation is SB. The shares of the resource allocated to relocating WPAR 201 on arrival LPAR 205 after relocation is SA. The total number of shares of the resource allocated on departure LPAR 203 is TSDep. The total number of shares of the resource allocated on the arrival LPAR 205 before relocation is TSArr.

If there are no WPARs on the arrival LPAR and the WPARs on the departure LPAR are allocated on a percentage basis, then the relocating WPAR is given a percentage-based allocation on the arrival LPAR according to the following formula:

$$\% A = \frac{TRDep \times \% B}{TRArr} \quad \text{(Formula 1)}$$

Where:
% A is the percentage allocation to the relocating WPAR after relocation;
% B is the percentage allocation to the relocating WPAR before relocation;
TRDep is the total physical resource of the departure LPAR; and,
TRArr is the total physical resource of the arrival LPAR.

If there are no WPARs on the arrival LPAR and the WPARs on the departure LPAR are allocated on a share basis, then the relocating WPAR is given a percentage-based allocation on the arrival LPAR. In one embodiment, the actual resources allocated to the relocating WPAR may be calculated according to the following formula:

$$AR = \frac{SB \times TRDep}{TSDep} \quad \text{(Formula 2)}$$

Where:
AR is the amount of physical resource allocated to the relocating WPAR;
SB is the share allocation to the relocating WPAR before relocation;
TRDep is the total physical resource of the departure LPAR; and,
TSDep is the total shares of the departure LPAR.

Then, the percentage-based allocation of the relocating WPAR on the arrival LPAR may be calculated according to the following formula:

$$\% A = \frac{AR \times 100}{TRArr} \quad \text{(Formula 3)}$$

Where:
% A is the percentage allocation of the relocating WPAR after relocation;
AR is the amount of physical resource allocated to the relocating WPAR; and,
TRArr is the total physical resource of the arrival LPAR.

Alternatively, formula 2 may be substituted for AR in formula 3 to yield the following formula:

$$\% A = \frac{SB \times TRDep \times 100}{TSDep \times TRArr} \quad \text{(Formula 4)}$$

If there are WPARs on the arrival LPAR that are allocated on a percentage basis and the WPARs on the departure LPAR are allocated on a percentage basis, then the percentage of resource allocated to the relocating WPAR may be calculated using Formula 1. If there are WPARs on the arrival LPAR that are allocated on a percentage basis and the WPARs on the departure LPAR are allocated on a share basis, then the percentage of resources allocated on the arrival LPAR to the relocating WPAR may be calculated using formulas 2 and 3 or, alternatively, formula 4.

If there are WPARs on the arrival LPAR that are allocated on a share basis and the WPARs on the departure LPAR are allocated on a share basis, the actual resource allocated to the relocating WPAR is calculated using formula 2. The actual resource allocated on the arrival LPAR to the relocating WPAR is given by the following:

$$AR = \frac{SA \times TRArr}{TSArr + SA} \quad \text{(Formula 5)}$$

Where:
AR is the amount of physical resource allocated to the relocating WPAR;
SA is the share allocation of the relocating WPAR after relocation;
TRArr is the total physical resource of the arrival LPAR;
TSArr is the total shares of the arrival LPAR before relocation.
Solving Formula 5 for SA Yields:

$$SA = \frac{AR \times TSArr}{TRArr - AR} \quad \text{(Formula 6)}$$

Thus, one can solve Formula 2 to determine AR and then solve formula 5 to determine SA. Alternatively, one can substitute Formula 2 into Formula 5 to obtain:

$$SA = \frac{TSArr \times SB \times TRDep}{TRArr \times TSDep - SB \times TRDep} \quad \text{(Formula 7)}$$

thereby solving for SA directly.

If the arrival LPAR has WPARs that are allocated on share basis and the WPARs on the departure LPAR are allocated on a percentage basis, then the actual resource allocated to the relocating WPAR can be calculated as follows:

$$AR = \frac{\%B \times TRDep}{100} \quad \text{(Formula 8)}$$

Then AR obtained from Formula 8 can be used in Formula 5 to calculate SA. Alternatively, one can substitute Formula 8 into Formula 5 to obtain:

$$SA = \frac{\frac{\%B}{100} \times TSArr \times TRDep}{TRArr - \frac{\%B}{100} \times TRDep} \quad \text{(Formula 9)}$$

thereby solving for SA directly.

Figure 3:
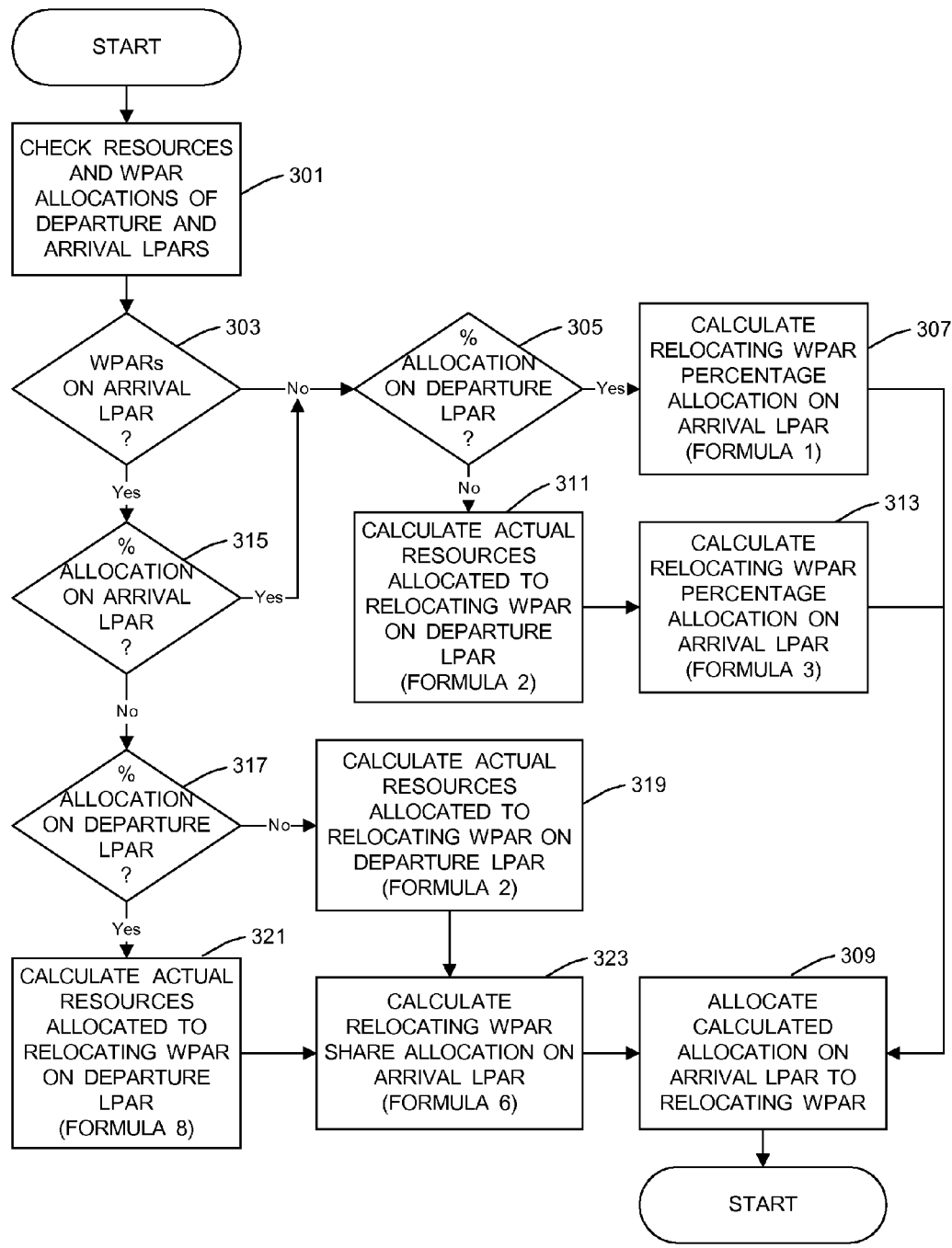
FIG. 3 is a flowchart of an embodiment of workload partition relocation according to the present invention.

FIG. 3 is a flowchart of one embodiment of relocation initiator 113 processing according to the present invention. The relocation initiator checks the resources and WPAR allocations of the departure and arrival LPARs, at block 301. If, as determined at decision block 303, there are no WPARs on the arrival LPAR, the relocation initiator determines, at decision block 305, if WPARs on the departure LPAR. If so, the relocation initiator calculates the relocation WPAR percentage allocation on the arrival LPAR using Formula 1, above, as indicated at block 307. Then, the relocation initiator allocates the calculated allocation on the arrival LPAR to the relocating WPAR, as indicated at block 309. If, as determined at decision block 305, WPARs on the departure LPAR are not allocated on a percentage basis, which means that the WPARs on the departure LPAR are allocated on a share basis, the relocation initiator calculates the actual number or amount of resources allocated to the relocating WPAR on the departure LPAR using Formula 2, as indicated at block.311. Then, the relocation initiator calculates the percentage allocation of the resource on the arrival LPAR to the relocating WPAR using Formula 3, as indicated at block 313. Then processing proceeds to block 309.

Returning to decision block 303, if it is determined that there are WPARs on the arrival LPAR, the relocation initiator determines, at decision block 315, if the WPARs on the arrival LPAR are allocated on a percentage basis. If so, processing proceeds to decision block 305 and continues as described above. If, as determined at decision block 315, the WPARs on the arrival LPAR are not allocated on a percentage basis, which means that the WPARs on the arrival LPAR are allocated on a share basis, the relocation initiator determines, at decision block 317, if the WPARs on the arrival LPAR are allocated on a percentage basis. If not, which means that the WPARs on the arrival LPAR are allocated on a share basis, the relocation initiator calculates the actual amount of the resource allocated to the relocating WPAR on the departing LPAR using Formula 2, as indicated at block 319. The relocation initiator then calculates the share allocation of the resource to the relocating WPAR on the arrival LPAR using Formula 6, as indicated at block 323, and processing proceeds to block 309. If, as determined at decision block 317, WPARs on the departure LPAR are allocated on a percentage basis, the relocation initiator calculates the actual amount of the resource allocated to the relocating WPAR on the departure LPAR using Formula 8, as indicated at block 321, and processing proceeds to block 323.

Figure 4:
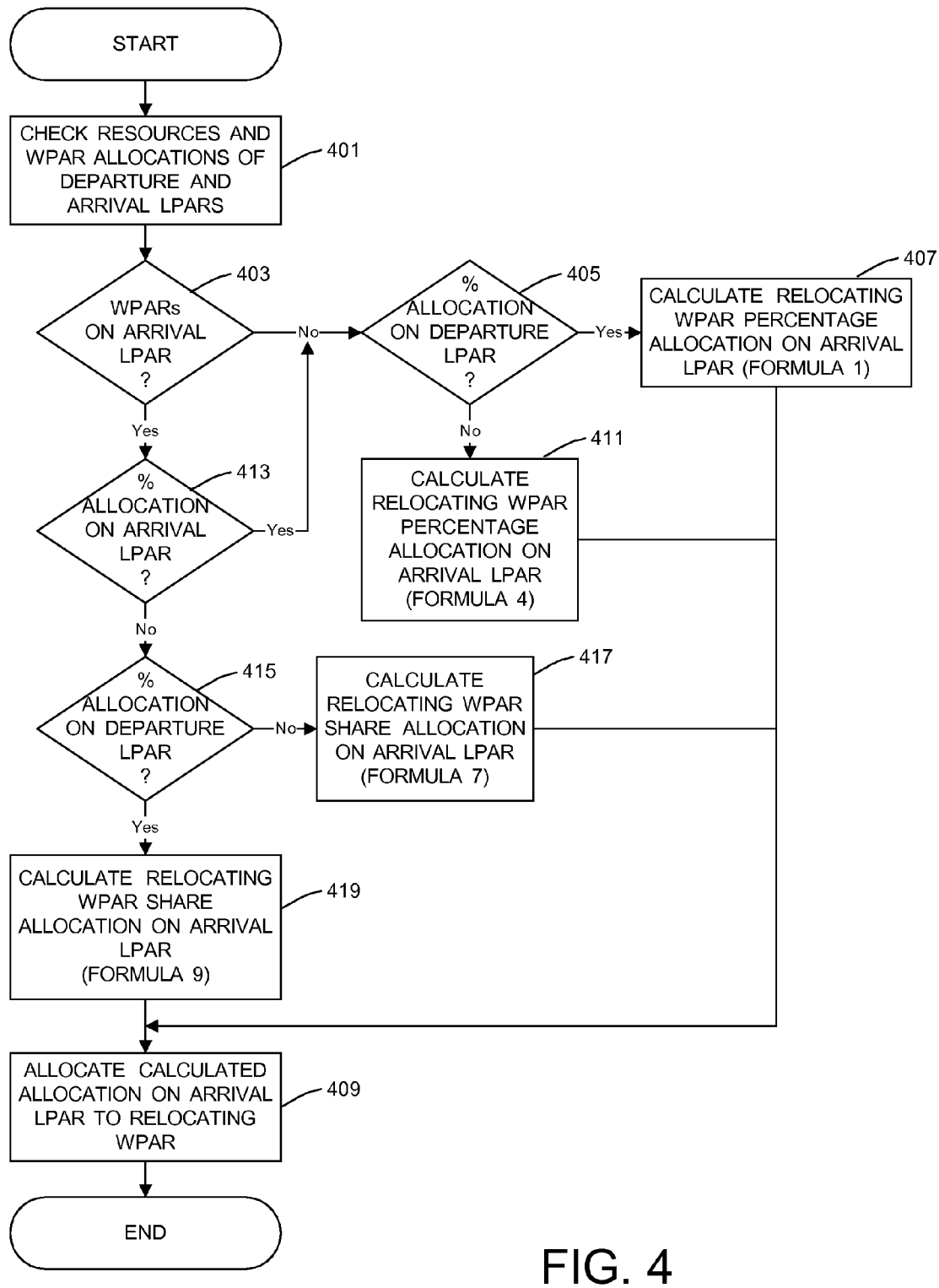
FIG. 4 is a flowchart of an alternative embodiment of workload partition relocation according to the present invention; and, FIG. 5 is a block diagram of an information handling system adapted to practice embodiments of the present invention.

FIG. 4 is a flowchart of an alternative embodiment of relocation initiator 113 processing according to the present invention. The relocation initiator checks the resources and WPAR allocations of the departure and arrival LPARs, at block 401. If, as determined at decision block 403, there are no WPARs on the arrival LPAR, the relocation initiator determines, at decision block 405, if WPARs on the departure LPAR. If so, the relocation initiator calculates the relocation WPAR percentage allocation on the arrival LPAR using Formula 1, above, as indicated at block 407. Then, the relocation initiator allocates the calculated allocation on the arrival LPAR to the relocating WPAR, as indicated at block 409. If, as determined at decision block 405, WPARs on the departure LPAR are not allocated on a percentage basis, which means that the WPARs on the departure LPAR are allocated on a share basis, the relocation initiator calculates the actual amount of the resource allocated to the relocating WPAR on the departure LPAR using Formula 4, as indicated at block.411. Then processing proceeds to block 409.

Returning to decision block 403, if it is determined that there are WPARs on the arrival LPAR, the relocation initiator determines, at decision block 413, if the WPARs on the arrival LPAR are allocated on a percentage basis. If so, processing proceeds to decision block 405 and continues as described above. If, as determined at decision block 413, the WPARs on the arrival LPAR are not allocated on a percentage basis, which means that the WPARs on the arrival LPAR are allocated on a share basis, the relocation initiator determines, at decision block 415, if the WPARs on the arrival LPAR are allocated on a percentage basis. If not, which means that the WPARs on the arrival LPAR are allocated on a share basis, the relocation initiator calculates the share allocation of the resource on the arrival LPAR to the relocating WPAR using Formula 7, as indicated at block 417, and processing proceeds to block 409. If, as determined at decision block 415, WPARs on the departure LPAR are allocated on a percentage basis, the relocation initiator calculates the share of the resource to be allocated to the relocating WPAR on the arrival LPAR using Formula 9, as indicated at block 419, and processing proceeds to block 409.

Figure 5:
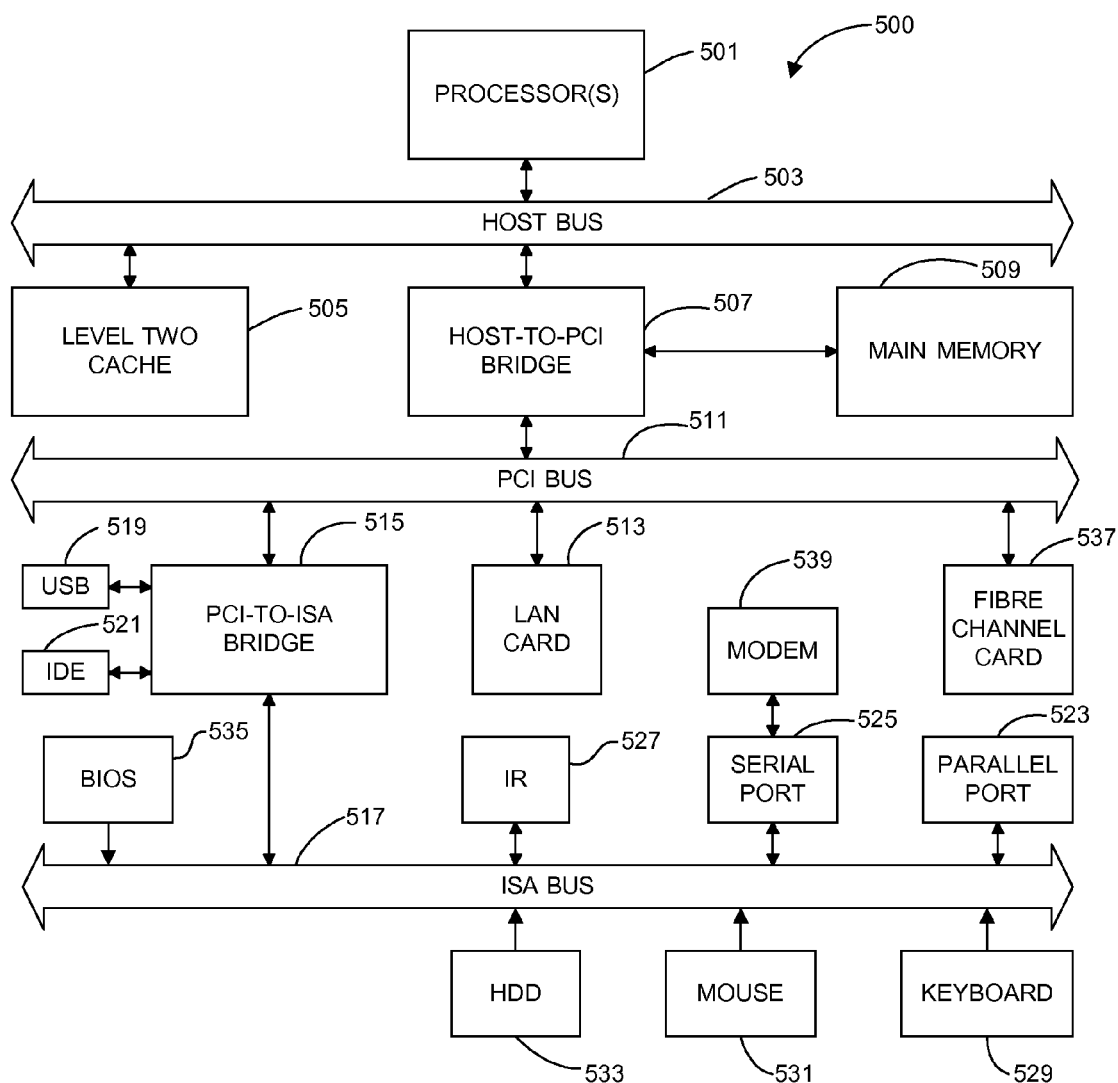

Referring now to FIG. 5, there is illustrated a block diagram of a generic information handling system 500 capable of performing the operations described herein. Computer system 500 includes processors 501 which are coupled to host bus 503. Processors 501 preferably include onboard cache memory. A level two (L2) cache memory 505 is also coupled to host bus 503. A Host-to-PCI bridge 507 is coupled to host bus 503. Host-to-PCI bridge 507, which is coupled to main memory 509, includes its own cache memory and main memory control functions. Host-to-PCI bridge 507 provides bus control to handle transfers among a PCI bus 511, processors 501, L2 cache 505, main memory 509, and host bus 503. PCI bus 511 provides an interface for a variety of devices including, for example, a local area network (LAN) card 513, a PCI-to-ISA bridge 515, which provides bus control to handle transfers between PCI bus 511 and an ISA bus 517, a universal serial bus (USB) 519, and an IDE device 521. PCI-to-ISA bridge 515 also includes onboard power management functionality. PCI-to-ISA bridge 515 can include other functional elements not shown, such as a real-time clock (RTC), DMA control, interrupt support, and system management bus support.

Peripheral devices and input/output (I/O) devices can be attached to various interfaces or ports coupled to ISA bus 517. Such interfaces or ports may include a parallel port 523, a serial port 525, an infrared (IR) interface 527, a keyboard interface 529, a mouse interface 531, and a hard disk drive (HDD) 533.

A BIOS 535 is coupled to ISA bus 517. BIOS 535 incorporates the necessary processor executable code for a variety of low-level system functions and system boot functions. BIOS 535 can be stored in any computer readable medium, including magnetic storage media, optical storage media, flash memory, random access memory (RAM), read only memory (ROM), and communications media conveying signals encoding the instructions (e.g., signals from a network). In order to couple computer system 500 to another computer system to copy files or send and receive messages over a network, LAN card 513 may be coupled to PCI bus 511. Similarly, a Fibre Channel card may be coupled to PCI bus 513. Additionally, a modem 539 may be coupled to ISA bus 517 through serial port 525 to support dial-up connections.

While the computer system described in FIG. 5 is capable of executing the invention described herein, the illustrated system is simply one example of a computer system. Those skilled in the art will appreciate that many other computer system designs are capable of performing the invention described herein.

While the computer system described in FIG. 5 is capable of executing the invention described herein, the illustrated system is simply one example of a computer system. Those skilled in the art will appreciate that many other computer system designs are capable of performing the invention described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method for relocating a workload partition (WPAR) from a departure logical partition (LPAR) to an arrival LPAR, comprising steps of:
    determining an amount of a resource allocated to said WPAR on said departure LPAR; and,
    allocating to said relocating WPAR on said arrival LPAR an amount of said resource substantially equal to the amount of said resource allocated to said relocating WPAR on said departure LPAR;
    wherein said WPAR runs on said departure LPAR and has its own virtualized operating system image and applications;
    wherein if there are no WPARs on the arrival LPAR, and the WPARs on the departure LPAR are not allocated on a percentage basis but the WPARs on the arrival LPAR are allocated on a share basis.

2. The method as claimed in claim 1, wherein, if there are no WPARs on said arrival LPAR and WPARs on said departure LPAR are allocated on a percentage basis, said allocating includes:
    giving said relocating WPAR a percentage-based allocation on said arrival LPAR according to $$\% A = \frac{TRDep \times \% B}{TRArr}$$

wherein:
    % A is the percentage of the resource allocated to the relocating WPAR after relocation;
    % B is the percentage of the resource allocated to the relocating WPAR before relocation;
    TRDep is the total amount of the resource on the departure LPAR; and,
    TRArr is the total amount of the resource on the arrival LPAR.

3. The method as claimed in claim 1, wherein if there are no WPARs on said arrival LPAR and WPARs on said departure LPAR are allocated on a share basis:
    said amount of a resource allocated to said relocating WPAR on said departure LPAR is determined according to $$AR = \frac{SB \times TRDep}{TSDep}$$

wherein:
    AR is the amount of the resource allocated to the relocating WPAR;
    SB is the share of the resource allocated to the relocating WPAR before relocation;
    TRDep is the total amount of the resource on the departure LPAR; and,
    TSDep is the total shares of the resource on the departure LPAR;
    and said allocating includes giving said relocating WPAR a percentage-based allocation on said arrival LPAR according to $$\%A = \frac{AR \times 100}{TRArr}$$

wherein:
%A is the percentage of the resource allocated to the relocating WPAR after relocation;
AR is the amount of the resource allocated to the relocating WPAR; and,
TRArr is the total amount of the resource on the arrival LPAR.

4. The method as claimed in claim 1, wherein, if there are no WPARs on said arrival LPAR and WPARs on said departure LPAR are allocated on a share basis, said allocating includes:
giving said relocating WPAR a percentage-based allocation on said arrival LPAR according to $$\%A = \frac{SB \times TRDep \times 100}{TSDep \times TRArr}$$

wherein:
%A is percentage of the resource allocated to the WPAR after relocation;
TRDep is the total amount of the resource on the departure LPAR;
TRArr is the total amount of the resource on the arrival LPAR;
SB is the share of the resource allocated to the relocating WPAR before relocation;
TSDep is the total shares of the resource on the departure LPAR; and,
TSArr is the total shares of the resource on the arrival LPAR.

5. The method as claimed in claim 1, wherein, if there are WPARs on said arrival LPAR that are allocated on a percentage basis and the WPARs on the departure machine are allocated on a percentage basis, said allocating includes:
giving said relocating WPAR a percentage-base allocation on said arrival LPAR according to $$\%A = \frac{TRDep \times \%B}{TRArr}$$

wherein:
%A is the percentage of the resource allocated to the relocating WPAR after relocation;
%B is the percentage of the resource allocated to the relocating WPAR before relocation;
TRDep is the total amount of the resource on the departure LPAR; and,
TRArr is the total amount of the resource on the arrival LPAR.

6. The method as claimed in claim 1, wherein, if there are WPARs on said arrival LPAR that are allocated on percentage basis and the WPARs on said departure LPAR are allocated on a share basis, said allocating includes:
giving said relocating WPAR a percentage-based allocation on said arrival LPAR according to $$\%A = \frac{SB \times TRDep \times 100}{TSDep \times TRArr}$$

wherein:
%A is percentage of the resource allocated to the relocating WPAR after relocation;
TRDep is the total amount of the resource on the departure LPAR;
TRArr is the total amount of the resource on the arrival LPAR;
SB is the share of the resource allocated to the relocating WPAR before relocation;
TSDep is the total shares of the resource on the departure LPAR; and,
TSArr is the total shares of the resource on the arrival LPAR.

7. The method as claimed in claim 1, wherein, if there are WPARs on said arrival LPAR that are allocated on a percentage basis and WPARs on said departure LPAR are allocated on a share basis:
said amount of a resource allocated to said relocating WPAR on said departure LPAR is determined according to $$AR = \frac{SB \times TRDep}{TSDep}$$

wherein:
AR is the amount of the resource allocated to the relocating WPAR;
SB is the share of the resource allocated to the relocating WPAR before relocation;
TRDep is the total amount of the resource on the departure LPAR; and,
TSDep is the total shares of the resource on the departure LPAR;
and said allocating includes giving said relocating WPAR a percentage-based allocation on said arrival LPAR according to $$\%A = \frac{AR \times 100}{TRArr}$$

wherein:
%A is the percentage of the resource allocated to the relocating WPAR after relocation;
AR is the amount of the resource allocated to the relocating WPAR; and,
TRArr is the total amount of the resource on the arrival LPAR.

8. The method as claimed in claim 1, wherein, if there are WPARs on said arrival LPAR that are allocated on a share basis and WPARs on said departure LPAR are allocated on a share basis:

said amount of a resource allocated to said relocating WPAR on said departure LPAR is determined according to $$AR = \frac{SB \times TRDep}{TSDep}$$

wherein:
AR is the amount of the resource allocated to the relocating WPAR;
SB is the share of the resource allocated to the relocating WPAR before relocation;
TRDep is the total amount of the resource on the departure LPAR; and,
TSDep is the total shares of the resource on the departure LPAR;
and said allocating includes giving said relocating WPAR a share-based allocation on said arrival LPAR according to according to $$SA = \frac{AR \times TSArr}{TRArr - AR}$$

wherein:
SA is the share of the resource allocated to the relocating WPAR after relocation;
AR is the amount of the resource allocated to the relocating WPAR;
TRArr is the total amount of the resource on the arrival LPAR; and,
TSArr is the total shares of the resource on the arrival LPAR before relocation.

9. The method as claimed in claim 1, wherein, if there are WPARs on said arrival LPAR that are allocated on a share basis and WPARs on said departure LPAR are allocated on a share basis, said allocating includes:
giving said relocating WPAR a share-based allocation on said arrival LPAR according to $$SA = \frac{TSArr \times SB \times TRDep}{TRArr \times TSDep - SB \times TRDep}$$

wherein:
SA is the share of the resource allocated to the relocating WPAR after relocation;
TRArr is the total amount of the resource on the arrival LPAR;
TSArr is the total shares of the resource on the arrival LPAR before relocation;
SB is the share of the resource allocated to the relocating WPAR before relocation;
TSDep is the total shares of the resource on the departure LPAR; and,
TSArr is the total shares of the resource on the arrival LPAR.

10. The method as claimed in claim 1, wherein, if there are WPARs on said arrival LPAR that are allocated on a share basis and workloads on said departure LPAR are allocated on a percentage basis:
said amount of said resource allocated on said departure LPAR is determined according to $$AR = \frac{\%B \times TRDep}{100}$$

wherein:
AR is the amount of the resource allocated to the relocating WPAR;
% B is the percentage of the resource allocated to the relocating WPAR before relocation;
TRDep is the total amount of the resource on the departure LPAR;
and said allocating includes giving said relocating WPAR share-based allocation of said resource on said arrival LPAR according to $$SA = \frac{AR \times TSArr}{TRArr - AR}$$

wherein:
SA is the share of the resource allocated to the relocating WPAR after relocation;
AR is the amount of the resource allocated to the relocating WPAR;
TRArr is the total amount of the resource on the arrival LPAR; and,
TSArr is the total shares of the resource on the arrival LPAR before relocation.

11. The method as claimed in claim 1, wherein, if there are WPARs on said arrival LPAR that are allocated on a share basis and workloads on said departure LPAR are allocated on a percentage basis, said allocating includes:
includes giving said relocating WPAR share-based allocation of said resource on said arrival LPAR according to $$SA = \frac{\frac{\%B}{100} \times TSArr \times TRDep}{TRArr - \frac{\%B}{100} \times TRDep}$$

wherein:
SA is the share of the resource allocated to the relocating WPAR after relocation;
% B is the percentage of the resource allocated to the relocating WPAR before relocation;
TRDep is the total amount of the resource on the departure LPAR;
TRArr is the total amount of the resource on the arrival LPAR; and,
TSArr is the total shares of the resource on the arrival LPAR before relocation.

* * * * *